US010798063B2

(12) United States Patent
Bonomi et al.

(10) Patent No.: US 10,798,063 B2
(45) Date of Patent: Oct. 6, 2020

(54) ENTERPRISE GRADE SECURITY FOR INTEGRATING MULTIPLE DOMAINS WITH A PUBLIC CLOUD

(71) Applicant: Nebbiolo Technologies, Inc., Milpitas, CA (US)

(72) Inventors: Flavio Bonomi, Palo Alto, CA (US); Pankaj Bhagra, Fremont, CA (US); Palani Chinnakannan, San Jose, CA (US); Ravi Bhagavatula, Milpitas, CA (US); Sureshkumar Kaliannan, Santa Clara, CA (US)

(73) Assignee: NEBBIOLO TECHNOLOGIES, INC. CA (US)

( * ) Notice: Subject to any disclaimer, the term of this patent is extended or adjusted under 35 U.S.C. 154(b) by 0 days.

(21) Appl. No.: 15/785,290

(22) Filed: Oct. 16, 2017

(65) Prior Publication Data
US 2018/0115519 A1    Apr. 26, 2018

Related U.S. Application Data

(60) Provisional application No. 62/411,422, filed on Oct. 21, 2016.

(51) Int. Cl.
*H04L 29/06* (2006.01)
*G06F 21/57* (2013.01)
(Continued)

(52) U.S. Cl.
CPC .......... *H04L 63/0272* (2013.01); *G06F 21/53* (2013.01); *G06F 21/57* (2013.01);
(Continued)

(58) Field of Classification Search
CPC .............................. G06F 21/53; H04L 63/0272
See application file for complete search history.

(56) References Cited

U.S. PATENT DOCUMENTS 5,630,053 A    5/1997  Morikawa
6,370,656 B1   4/2002  Olarig
(Continued)

FOREIGN PATENT DOCUMENTS

EP    2800303 A1    11/2014
EP    3437256 A1     2/2019
(Continued)

OTHER PUBLICATIONS

"International Search Report" and "Written Opinion of the International Searching Authority," Patent Cooperation Treaty Application No. PCT/US2017/023898, dated Jun. 19, 2017, 16 pages.
(Continued)

*Primary Examiner* — Ali Shayanfar
(74) *Attorney, Agent, or Firm* — Barry Choobin; Patent 360 LLC

(57) ABSTRACT

Enterprise grade security for integrating multiple computing domains with a public cloud is provided herein. An example system a forwarder that provides one-way data publishing to a public cloud and a data bus that provides domain-to-domain messaging between a plurality of domains. At least one of the plurality of domains includes operational technology infrastructure devices and operational technology virtual machines. The operational technology virtual machines are communicatively coupled to the operational technology infrastructure devices using one or more operational technology switches. The operational technology switches isolates the operational technology infrastructure devices and facilitates one-way communication and prevents bidirectional communication to the operational technology infrastructure devices from the public cloud.

13 Claims, 4 Drawing Sheets

(51) Int. Cl.
*G06F 21/53* (2013.01)
*H04L 9/08* (2006.01)
*H04L 9/00* (2006.01)
*H04L 9/30* (2006.01)
*H04L 29/08* (2006.01)

(52) U.S. Cl.
CPC ............ *H04L 9/006* (2013.01); *H04L 9/0897* (2013.01); *H04L 9/30* (2013.01); *H04L 63/0428* (2013.01); *H04L 63/101* (2013.01); *H04L 63/1458* (2013.01); *H04L 63/0823* (2013.01); *H04L 67/10* (2013.01); *Y02P 90/86* (2015.11)

(56) References Cited

U.S. PATENT DOCUMENTS

| | | | |
|---|---|---|---|
| 6,763,479 B1 | 7/2004 | Hebert | |
| 8,190,084 B1 | 5/2012 | Gunasekara | |
| 9,294,443 B2* | 3/2016 | Johnson | H04L 63/0272 |
| 9,842,013 B2 | 4/2016 | Arjun et al. | |
| 10,044,524 B1 | 8/2018 | Edelhaus et al. | |
| 10,419,394 B2* | 9/2019 | Chou | H04L 61/2585 |
| 2002/0156888 A1 | 10/2002 | Lee et al. | |
| 2003/0131177 A1 | 7/2003 | Ng | |
| 2004/0128370 A1 | 7/2004 | Kortright | |
| 2004/0205388 A1 | 10/2004 | Nakano | |
| 2005/0232285 A1* | 10/2005 | Terrell | H04L 67/1097 370/401 |
| 2006/0206602 A1 | 9/2006 | Hunter et al. | |
| 2007/0083625 A1 | 4/2007 | Chamdani et al. | |
| 2007/0103476 A1 | 5/2007 | Huang et al. | |
| 2008/0240163 A1 | 10/2008 | Ibrahim et al. | |
| 2008/0250042 A1 | 10/2008 | Mopur et al. | |
| 2009/0070617 A1 | 3/2009 | Arimilli et al. | |
| 2010/0082811 A1 | 4/2010 | Van Der Merwe et al. | |
| 2010/0290473 A1* | 11/2010 | Enduri | H04L 49/357 370/395.53 |
| 2011/0103259 A1 | 5/2011 | Aybay et al. | |
| 2012/0026898 A1 | 2/2012 | Sen et al. | |
| 2012/0096205 A1 | 4/2012 | Velayudhan et al. | |
| 2012/0304262 A1* | 11/2012 | Cucco | H04L 63/08 726/6 |
| 2012/0324442 A1 | 12/2012 | Barde | |
| 2013/0104236 A1* | 4/2013 | Ray | H04L 63/1433 726/25 |
| 2013/0237268 A1 | 9/2013 | Teng et al. | |
| 2014/0006594 A1 | 1/2014 | Gabriel | |
| 2014/0032173 A1 | 1/2014 | Kida et al. | |
| 2014/0086254 A1* | 3/2014 | Hardie | H04L 45/60 370/400 |
| 2014/0136952 A1 | 5/2014 | Zhu et al. | |
| 2014/0228978 A1 | 8/2014 | Neubert et al. | |
| 2014/0258491 A1* | 9/2014 | Forristal | H04L 45/741 709/223 |
| 2014/0330925 A1 | 11/2014 | Lee et al. | |
| 2014/0380488 A1 | 12/2014 | Datta Ray et al. | |
| 2015/0006733 A1 | 1/2015 | Khan et al. | |
| 2015/0043382 A1 | 2/2015 | Arora et al. | |
| 2015/0063369 A1 | 3/2015 | Lida et al. | |
| 2015/0094868 A1 | 4/2015 | Diab et al. | |
| 2015/0153175 A1 | 6/2015 | Skaaksrud | |
| 2015/0249586 A1 | 9/2015 | Byers et al. | |
| 2015/0256611 A1* | 9/2015 | Cohn | H04L 63/0272 709/202 |
| 2015/0271642 A1 | 9/2015 | Raymond et al. | |
| 2015/0317835 A1 | 11/2015 | Byers | |
| 2016/0036707 A1 | 2/2016 | Mestery et al. | |
| 2016/0124819 A1 | 5/2016 | Killadi et al. | |
| 2016/0162299 A1 | 6/2016 | Ali et al. | |
| 2016/0182458 A1* | 6/2016 | Shatzkamer | H04L 63/0428 713/168 |
| 2016/0182639 A1 | 6/2016 | Hong et al. | |
| 2016/0210209 A1 | 7/2016 | Verkaik et al. | |
| 2016/0224081 A1 | 8/2016 | Worthington et al. | |
| 2016/0224277 A1 | 8/2016 | Batra et al. | |
| 2016/0308793 A1 | 10/2016 | Levy-Abegnoli et al. | |
| 2017/0026291 A1 | 1/2017 | Smith et al. | |
| 2017/0048200 A1* | 2/2017 | Chastain | H04L 63/0272 |
| 2017/0116097 A1 | 4/2017 | Keremane et al. | |
| 2017/0116526 A1* | 4/2017 | Salam | G06N 5/003 |
| 2017/0171298 A1* | 6/2017 | Jambur Sathyanarayana | H04L 67/10 |
| 2017/0187640 A1 | 6/2017 | Vasudevan et al. | |
| 2017/0222831 A1 | 8/2017 | Zirkler | |
| 2017/0277173 A1 | 9/2017 | Bonomi et al. | |
| 2017/0284839 A1 | 10/2017 | Ojala | |
| 2017/0322815 A1* | 11/2017 | Buswell | G06F 9/4406 |
| 2017/0359366 A1* | 12/2017 | Bushey | H04W 4/38 |
| 2018/0019948 A1* | 1/2018 | Patwardhan | H04L 47/803 |
| 2018/0024537 A1 | 1/2018 | Chauvet et al. | |
| 2018/0063020 A1 | 3/2018 | Bhagavatula et al. | |
| 2018/0068134 A1 | 3/2018 | Schwarz | |
| 2018/0115457 A1 | 4/2018 | Bonomi et al. | |
| 2018/0237040 A1 | 8/2018 | Mong et al. | |
| 2018/0302330 A1 | 10/2018 | Bush | |
| 2018/0316729 A1 | 11/2018 | Chauvet et al. | |
| 2018/0321256 A1 | 11/2018 | Plescia | |
| 2018/0321356 A1 | 11/2018 | Kulkarni et al. | |
| 2018/0374188 A1 | 12/2018 | LV et al. | |
| 2019/0044894 A1 | 2/2019 | Bonomi et al. | |
| 2019/0109728 A1 | 4/2019 | Steiner et al. | |
| 2019/0116241 A1 | 4/2019 | Bonomi et al. | |

FOREIGN PATENT DOCUMENTS

| | | |
|---|---|---|
| GB | 2521376 A | 6/2015 |
| JP | 2009282914 A | 12/2009 |
| WO | WO2016018332 A1 | 2/2016 |
| WO | WO2017132320 A1 | 8/2017 |
| WO | WO2017165701 A1 | 9/2017 |
| WO | WO2018044737 A1 | 3/2018 |
| WO | WO2018075546 A1 | 4/2018 |

OTHER PUBLICATIONS

"International Search Report" and "Written Opinion of the International Searching Authority," Patent Cooperation Treaty Application No. PCT/US2017/048751, dated Nov. 6, 2017, 9 pages.

"International Search Report" and "Written Opinion of the International Searching Authority," Patent Cooperation Treaty Application No. PCT/US2017/057027, dated Feb. 14, 2018, 13 pages.

Bonomi et al., "Fog computing: A platform for Internet of things and analytics," In: Big Data and Internet of Things: A Roadmap for Smart Environments [online], Mar. 12, 2014, Retrieved from the Internet: <URL:https://pdfs. semanticscholar.org/5fe4/c23964c165f42b4e0cd98bf686d04501e628.pdf>, 22 pages.

Ginter, Andrew, "An IT Perspective of Control Systems Security," Industrial Defender [online], Oct. 2009, Retrieved from the Internet: <URL:https://www.controlglobal.com/assets/Media/Whitepapers/2010/100223_IndustrialDefender_ControlSystemSecurity.pdf>, 9 pages.

Szefer, Jakub et al., "Eliminating the hypervisor attack surface for a more secure cloud," Researchgate [online], Oct. 21, 2011, Retrieved from the Internet: <URL:https://www.cs.princeton.edu/~jrex/papers/ccs11.pdf>, 12 pages.

Palekar, Ashwin, "Network Isolation Options for Machines in Windows Azure Virtual Networks," [online], Mar. 28, 2014, Retrieved from the Internet: <URL:https://azure.microsoft.com/en-us/blog/network-isolation-options-for-machines-in-windows-azure-virtual-networks/>, 65 pages.

"International Search Report and Written Opinion", Patent Cooperation Treaty Application No. PCT/US2017/015045, dated Apr. 26, 2017, 15 pages.

Holloway, Talor, "IBM PowerHA 7.1 heartbeat over SAN," Jan. 21, 2013, https://www.ibm.com/developerworks/aix/library/auaix/-powerha-heartbeatindex. Html.

Singh, Suman Kumar, Loderup, Morten, Noman, Farrukh, "Building High-Availabiltiy Clusters," Oct. 2004, http://www.dell.com/down loads/g lobal/power/ps4q04-20040 151 -sing h .pdf.

(56) References Cited

OTHER PUBLICATIONS

Cisco, "Cisco Nexus 7000 Series Supervisor Module:" 1992, http://www.floralimited.com/Files/Products/CISCO/BrochureUrl/Cisco_7000_Supervisor_Module(2).pdf.
Rajabali, Taha, "How to Increase System Availabiity without Redundancy;" Dec. 8,2013, https://web.archive.org/web/20131208193132/https://www.bastiansolutions.com/blog/index.php/2013/04/19/how-to-increasesystem-availability-without-redundancy/#.Wp1x3TN96n8.
VMWare, "How VMware HA Works:" Feb. 15, 2016, https://web.archive.org/web/20160215231257/https://pubs.vmware.com/vsphere-4-esxvcenter/index.jsp?topic=/com.vmware.vsphere.availability.doc_41/cusehaworks.html.
"Extended European Search Report," European Patent Application No. 17771191.8, dated Sep. 27, 2019, 8 pages.
Cisco, "Fog Computing and the Internet of Things: Extend the Cloud to Where the Things Are," [online] Jan. 1, 2015, Retrieved from the Internet: <URL:https://www.cisco.com/c/dam/en_us/solutions/trends/iot/docs/computing-overview.pdf> [retrieved on Sep. 18, 2019], 6 pages.
"OPC Unified Architecture," Wikipedia, Mar. 1, 2016, Retrieved from the Internet: <URL:https://en.wikipedia.org/w/index.php?title=OPC_Unified_Architecture&oldid=707648208> [retrieved on Sep. 18, 2019], 7 pages.
"Office Action," Japanese Patent Application No. 2019-500751, dated Oct. 29, 2019, 11 pages [23 pages including translation].
Ohnishi et. al., "A Study of Architecture for Control System in Connection with Cloud Server," Technical Report of IEICE, Japan, The Institute of Electronics, Information and Communication Engineers (IEICE), vol. 115, No. 219, Sep. 3, 2015, pp. 11-14.
Takahiro Mitsui, "Toshiba M2M Cloud's Approach Which Performs Appropriate Control according to Product Status," T-Soul, vol. 13, Toshiba Solutions Corporation, Jan. 31, 2015, pp. 6-7.

\* cited by examiner

ENTERPRISE GRADE SECURITY FOR INTEGRATING MULTIPLE DOMAINS WITH A PUBLIC CLOUD

CROSS REFERENCE TO RELATED APPLICATIONS

This application claims the benefit and priority of U.S. Provisional Patent Application Ser. No. 62/411,422, filed on Oct. 21, 2016, titled "Enterprise Grade Security Enablement for IT/OT Device Integration into Public Cloud" which is hereby incorporated by reference in its entirety, including all references and appendices cited therein.

FIELD OF INVENTION

The present disclosure is directed to computer security, and more particularly, but not by limitation to enterprise grade security for integrating multiple IT (Information Technology)/OT (Operational Technology) computing domains with a public cloud. Embodiments implement fognodes with foglets hosting virtual machines that service domain devices interconnected through switches. The IT/OT domains isolation between one another are enforced by default and optionally disabled by the administrator. A forwarder service is implemented for publishing data from the IT/OT domains to a cloud environment, but the cloud services are prevented from transmitting data to any of the domains in the fognode to prevent malicious attacks originating in the cloud from spreading into the fognode. The domains within the fognode are isolated from one another using the switches and virtual network security functions.

SUMMARY

According to some embodiments, the present disclosure is directed to a system, comprising: (a) at least one foglet executing within the fognode, the foglet comprising: (i) a data bus that provides domain-to-domain messaging between: (A) a first domain comprising: (1) operational technology (OT) virtual machines providing applications and services to operational technology infrastructure devices connected to that domain; and (2) one or more operational technology switches providing the connectivity to the aforementioned devices; (B) a second domain comprising: (1) informational technology (IT) virtual machines providing applications and services to informational technology infrastructure devices connected to the domain; and (2) one or more informational technology switches providing the connectivity to the aforementioned devices; and (b) a host that manages one or more communication paths between operational technology switch, the operational technology virtual machines, and the operational technology infrastructure devices, and the informational technology switch, the informational technology, and the informational technology infrastructure devices.

According to some embodiments, the present disclosure is directed to a system, comprising: (a) a forwarder that provides one-way data publishing connectivity to a cloud; and (b) a data bus that provides domain-to-domain secure messaging between a plurality of domains, wherein at least one of the plurality of domains comprises a first domain with first domain devices and first domain virtual machines, wherein the first domain virtual machines are communicatively coupled to the first domain devices using one or more first domain switches, wherein the first domain switches isolate the first domain devices from other domains, and the forwarder prevents communication from the cloud to the first domain

DESCRIPTION OF THE DRAWINGS

Certain embodiments of the present technology are illustrated by the accompanying figures. It will be understood that the figures are not necessarily to scale and that details not necessary for an understanding of the technology or that other details difficult to perceive may be omitted. It will be understood that the technology is not necessarily limited to the particular embodiments illustrated herein.

DETAILED DESCRIPTION

Figure 1:
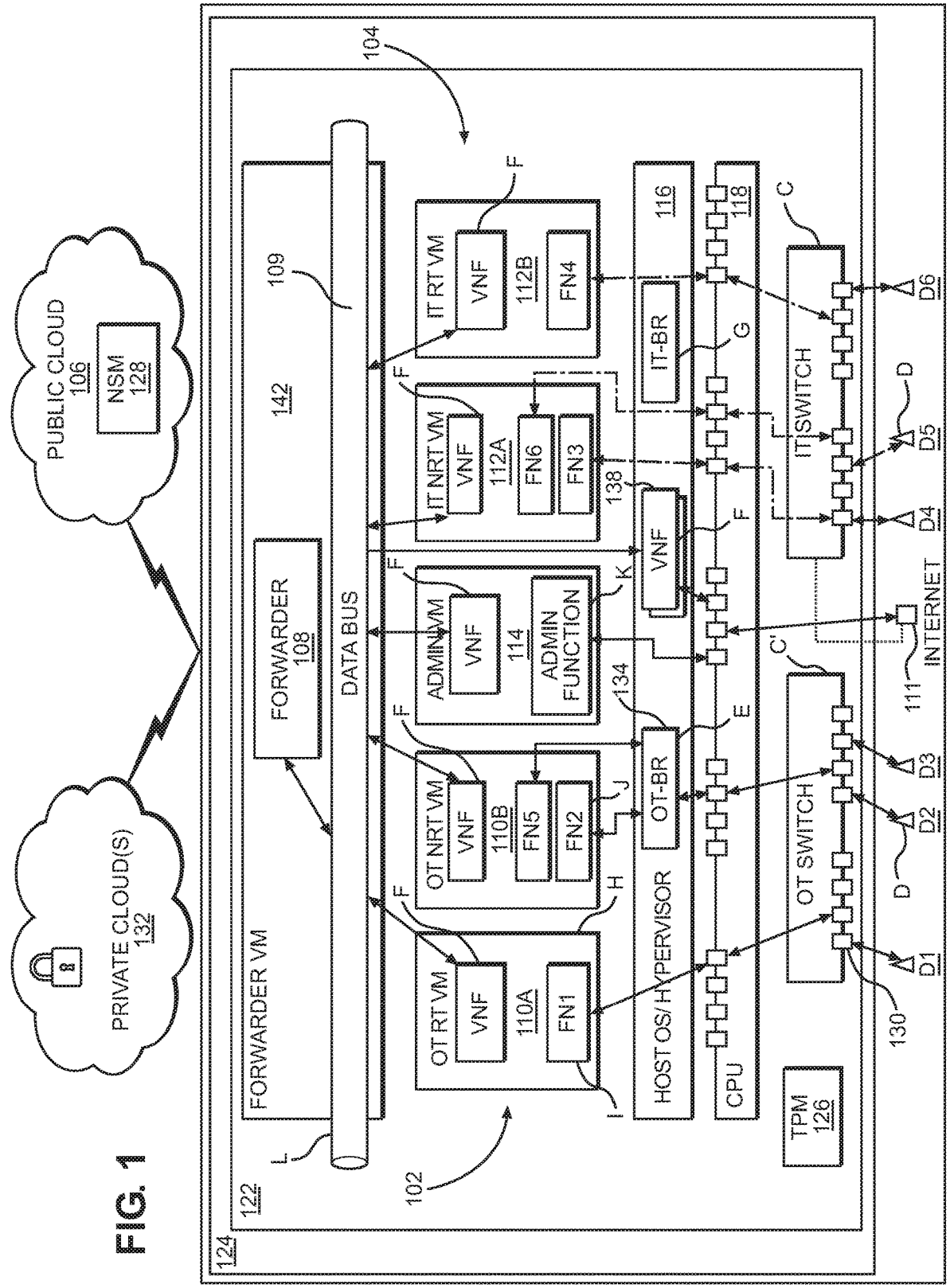
FIG. 1 is a schematic diagram of an example system architecture that implements enterprise grade security for integrating multiple computing domains with a public cloud, in accordance with the present disclosure.

Fog computing facilitates management of Industrial devices like robots, CNC (computer numeric controlled) machines, manufacturing machines, sensors, actuators, power management devices, air handlers, coolant circulating pumps and other devices, which are collectively called operational technology (OT) devices, are present in industrial floor, power plants, oil and gas rigs, high end data centers and other sectors. Many other OT devices exist and would be known to one of ordinary skill in the art.

The management of these OT devices requires compute servers, network connectivity and associated network equipment, storage devices and associated software, which are collectively called informational technology (IT) infrastructure. Typically, the IT infrastructure is co-located in an operations center along with the OT infrastructure (for example in the same manufacturing facility location). However, these two systems are isolated from each other for the reasons of security, different management structure, and so forth. With the need for globalization and for enabling flexible compute in the IT infrastructure, the cloud-computing infrastructure is also deployed in conjunction. For example, a manufacturing and distribution company can implement a manufacturing facility and a logistics facility. These two separate facilities can be located anywhere in the world (and may not be co-located with one another) but these systems can share information through the cloud, which in some instances includes a public cloud infrastructure.

The IT systems and OT systems are each referred to collectively as domains. For example the IT infrastructure and its systems are referred to as an IT domain, while the OT infrastructure and its systems are referred to as an OT domain. A company may implement additional domains as well.

The Industrial 4.0 architecture includes cloud connectivity to the traditional IT/OT devices to enable them to communicate with applications in the cloud. Connectivity to the cloud and the interoperation of the IT/OT devices is desirable for variety of reasons like zero touch remote management, single pane of asset management, system condition monitoring, predictive maintenance, remote software upgrade etc., with the main objective of increasing productivity and decreasing operations costs—just to name a few. This interoperation requirement of the OT and the IT infrastructure presents several challenges in system management, security, system troubleshooting and maintenance, and enabling different organizational groups for effectively managing the system.

The present disclosure describes various system architectures for providing security within these domain-to-domain (D2D) and D2D-to-cloud configurations. The present disclosure is directed to security for D2D communication and D2D-to-cloud communication. Domains can be logically and physically separated from one another to reduce or eliminate OT devices being compromised, even if the IT devices have been compromised.

The present disclosure describes solutions for security issues within these systems and requirements that manifest in the integration of IT/OT devices to the public cloud and demonstrates how various system architectures and software addresses these issues.

The Fog computing infrastructure enables the interoperation of IT/OT devices with the public cloud. Following are the key security requirements for interoperation between these two domains. With respect to fognode security, a fognode infrastructure element should provide uncompromised, secure and trusted services at the network edge that enables connecting the IT/OT devices to the cloud.

With respect to IT/OT device connectivity security, network connectivity requirements for the IT/OT devices to securely connect to the fognode that provides device identity and authentication, device access control, tamper protection and secure device lifecycle management—just to name a few.

With respect to cloud connectivity security, the present disclosure describes network connectivity requirements for the fognode to securely connect to the Internet/cloud that provides authenticity, confidentiality, data protection and integrity.

Systems and methods of the present disclosure provide network services in the fognode that provide isolation, protection, and privacy enablement between the different OT networks, OT devices and OT applications on the fognode.

Systems and methods of the present disclosure provide application isolation security, where in some embodiments strict isolation of the OT applications and services requirements are implemented to prevent inadvertent interference, Denial of Service (DOS) and malicious DOS from a compromised application.

According to some embodiments, the present disclosure provides auditing features such as monitoring and logging service requirements that detects vulnerabilities, threats, malware/virus, and denial of service attacks on the entire fog and cloud infrastructure and provides logging and alarming services.

In various embodiments, the present disclosure provides secure application hosting that includes compute service requirements that enable secure rapid deployment of applications and services at the fognode by a cloud controller.

In some embodiments, the present disclosure provides a check valve message bus that enables secure messaging requirements for the IT/OT device data processing components to enable one-way data publishing service to the external applications and services in the cloud while preventing any access from the external applications into the IT/OT networks.

In some embodiments, the present disclosure provides cloud component security which comprises security mechanisms in the cloud with requirements to minimize the exposure of the cloud services, reduce the DOS/DDOS attack surface, prevents data theft and data loss, perform device authentication and authorization and deduct rogue devices and isolate them.

End user security can be implemented as security mechanisms with requirements to support strict role based access control of the resource instances in the entire fog infrastructure.

These and other advantages of the present disclosure are described in greater detail below with reference to the collective drawings FIGS. 1-4.

FIG. 1 illustrates an example system architecture 100 that provides security between a plurality of domains, such as an IT domain 102 and an OT domain 104, as well as between the IT domain 102 and the OT domain 104 and a public cloud infrastructure 106. The system architecture 100 can comprise additional domains and the public cloud could also comprise a private cloud 132. The system architecture 100 can also comprise a forwarder 108, a data bus 109, OT virtual machines 110A-B, IT virtual machines 112A-B, an administrative VM 114, a host operating system and hypervisor layer 116, as well as a hardware layer 118, and a switch layer 120. These components are incorporated into a foglet 122.

The system architecture 100 comprises a fognode 124 which in turn comprises a foglet 122 and associated hardware/software infrastructure components that enable the IT/OT device interconnection (e.g., IT domain 102 and OT domain 104) with the public cloud 106 and their secure interoperation. Multiple foglets can be implemented within the fognode 124 in some embodiments.

The IT VM devices and OT VM devices FN1-FN6 are securely connected to the public cloud 106 through their respective domains. These devices exist outside the foglet 122 and the fognode 124.

The fognode 124 infrastructure and the associated software guarantee strict isolation of the OT devices D1-3 and IT devices D4-6 from one another as well as between the cloud and devices within the scope of the fognode 124. For example, a set of OT devices such as manufacturing robots in the OT domain 104 are isolated to such extent that any device present in a different OT domain or any software component present in the public cloud 106 cannot access the aforementioned OT robots through the system architecture 100. This is made possible through a data bus 109. In various embodiments, the data bus 109 comprises a strict domain-to-domain messaging data bus between the fognode 124 and components of the public cloud 106.

In accordance with the present disclosure an example fognode 124 comprises a Nebbiolo Technology NFN 300 Series Fognode, and the foglet 122 comprises an NFL 1000c Foglet that implements physical fognode security and enables platform integrity as described infra.

The foglet 122 is equipped with a trusted platform module (TPM) 126. The TPM 126 device provides and establishes a hardware-based root of trust. The TPM device 126 enables the core IOT (Internet of things) infrastructure platform integrity upon which the entire IT/OT device management and integration to the public cloud 106 rests. In some embodiments, platform hardware/software configuration is bound to the TPM device 126 that enables measurement and verification of platform software.

The TPM device 126 is used for secure booting the fognode, establishing a root of trust for subsequent software upgrades and software functions, storage for security keys, data encryption and decryption.

The TPM device 126 implements software that enables secure-boot of the fognode element, which verifies firmware integrity, boot loaders, network and storage option ROMs, PXE/iPXE (preboot execution environment) boot code; the integrity and certification of the host operating system, hypervisor and the infrastructure software.

Fognode operating system (OS) software enables a measured-boot mechanism in the fognode 124 that allows a cloud-based manager, referred to as a network security monitor 128 (NSM) to measure, step-by-step, the boot process to validate the authenticity of the different software components and verify that none of the software component is compromised.

The fognode OS also enables the same secure-boot mechanism to all the virtual machines deployed on the foglet 122 using an open virtual machine firmware, unified extensible firmware interface (OVMF UEFI BIOS) and a virtual TPM device 126.

In one example embodiment, the foglet 122 is equipped with an Intel Xeon Class processors i5 or i7, which are VT-x enabled with hardware security for virtualization. This secure virtualization through the Intel TXT enables device application isolation through virtualization.

IT/OT device connectivity security can also be facilitated within the system architecture 100. The fognode 124 and the foglet 122 implement mechanisms for securely connecting IT/OT devices to the fognode infrastructure as follows.

An IT switch element C and OT switch elements C' are part of the foglet 110 and provide switch ports that are of different types to support a wide range of physical layer connectivity to IT/OT devices. For example, the IT switch element C provides ports such as port 130 that services OT device D1. In some embodiments, the switch ports can support Ethernet media, EtherCAT, Modbus and a range of other types.

According to some embodiments, the IT/OT switches are separate units as a strict IT/OT device separation and mutual isolation requires them to be separate. The IT/OT switches can comprise either physical device or virtual devices in some embodiments.

The IT/OT switches support different types of layer 2 networking infrastructure as follows. In one embodiment, the IT/OT switches implement physical port pinning mechanism that enable a connected device such as D1 to be directly passed (PCIe pass through) to an application enabled in an OT virtual machine 120 (OT RT VM), by-passing a host OS/hypervisor layer 122. This mechanism provides improved device protection, as connectivity to the device D1 is possible only from the OT virtual machine 110A (OT RT VM).

In addition, data generated by the device (D1) is directly consumed by the application operating in the OT virtual machine 110A (OT RT VM), thereby eliminating any potential data loss/theft that could occur in the OT switch elements C', a host CPU in the hardware layer 118, and the host OS and hypervisor 116.

An I/O virtualization mechanism enables a connected device such as device D2 to use an industry standard SR-IOV mechanism to isolate the device D2 from the OT switch C' thereby reducing any attack surface on the device D2, but the device D2 is exposed to the host OS and hypervisor 116. The fognode OS leverages this technique to provide a different level of security mechanism. Device traffic is separated into control, management, sensitive critical data (like robot axis positions), and non-critical data streams. Each stream is handled by a different virtual network interface card (VNIC) on which different security policies are applied so as to enable selective exposure of device data of the device D2 to higher-level functions and role based access control to different functions of the device D2. Of note, the VNCIs are represented by the lines connecting a VM to the OT-BR and to the switch ports or VNF. For certain configurations the arrows are not shown terminating on the IT-BR for simplicity of illustration.

A virtual local area network (VLAN) mechanism enables the connected devices D3 and D5 (or other group of devices in the OT and/or IT domains) to be accessible and managed only by a soft real-time function enabled virtual machine. VLANs are identifiers or tags present in a packet that enables any of the IT/OT switches to forward them to ports that are configured to accept only packets with the specified tag. This VLAN tagging ensures that only configured VMs receive packets with the associated tags. In one embodiment, multiple domains/networks are connected to a physical or virtual switch (such as IT switch C) and each network comprises its own VLAN. A VLAN mechanism provides the best isolation at the network layer 2. In some embodiments, each OT domain is enabled in its own VLAN to provide isolation between the other networks.

Fognode OS software implements and provides a unique device DNA management algorithm, which determines characteristic features of any connected device (such as D1-D6) and computes a unique finger print of each device. This fingerprint is used to determine the identity of the device and detect any compromised device as the device finger print changes when compromised. In some embodiments, the unique finger print allows for isolation of domains and the devices included in those domains from other domains. This provides for an efficient grouping/balkanizing of devices based on unique identifiers.

Fognodes and foglets of the present disclosure also implement mechanisms for securely connecting the fognode 124 to the public cloud 106. In one embodiment, an administrative VM 114 provides a rich set of mechanisms and tools for securely connecting the foglet 122 to the public cloud 106.

In some embodiments, the administrative VM 114 uses REST API communication over a secure industry standard enveloped public key encryption (EPKE) and public key infrastructure (PKI) to the public cloud 106. In this mechanism, the fognode 124 to public cloud 106 communication is initiated in a secure manner by the fognode 124 using a REST API, which eliminates any kind of reverse communication. In some embodiments, the administrative VM 114 uses a scheme that utilizes AES256 encryption and 4096 bit public/private key pairs. This type of communication is the most secure, however, is restrictive due to CORS, firewalls and web proxy servers in the communication path. Thus, other similar secure approaches can also be utilized.

Websocket based communication code is implemented to facilitate communication from the fognode 124 to the public cloud 106 in various embodiments. This type of data path communication transfers large amounts of monitoring data periodically and therefore requires a connection oriented protocol.

Open VPN based communication between the fognode 124 and a private cloud 132 can also be facilitated. This mechanism is suitable for secure communication between two or more private networks that are interconnected over the public Internet 111. This mechanism is used in IT/OT environments that use OT controllers in cloud and require bi-directional communication over a wide range of network sockets and/or network protocols.

In some embodiments, the system architecture 100 provides a rich set of tools for auto detecting network firewalls and web server proxies for determining the correct connectivity mechanism.

The system architecture 100, and specifically the fognode OS enables a variety of compute and network services in the foglet 122 that provide isolation, protection, and privacy enablement between, for example, different OT networks, OT devices and OT applications on the fognode 124. Isolation and clean separation between the different OT networks (if multiple OT networks/domains are present) and between the IT domain is advantageous. The OT devices D1-3 for example, could be robots in a manufacturing cell performing critical tasks that should not be compromised. In some embodiments, isolation security is achieved in the following manner. The Host OS/Hypervisor layer 116 is above the OT switch C' and supports EAL4+ or EAL-7 certified hypervisors. These secure hypervisors enable creation of virtual machines OT RT VM (OT virtual machine 110A), OT NRT VM (OT virtual machine 110B), IT RT VM (IT virtual machine 112A) and IT NRT VM (IT virtual machine 110B). These virtual machines are enabled with strict isolation, firewall rules and policies that eliminate one VM compromising another VM.

Virtual switches (which can comprise an open vSwitch "OVS") within the Host OS/Hypervisor layer 116, such as OT BR 134 and IT BR 136 are used for integrating the IT/OT domains. OVS switches provide switch level mechanisms for building a firewall using ovs-flows. Ovs-flows are programmed to prevent traffic flows destined for one OT virtual machines 110A-B to any other VMs. Policies for separating a device flow (I/O of each device) into multiple streams of control, management, critical data and non-critical data flows is enabled through ovs-flows and policies.

In one embodiment, a VNF 138 within the Host OS/Hypervisor layer 116 allows only certain specific outbound traffic to a specified list of IPV4/IPV6 addresses that represent a next processing element (forwarder 108 or the public cloud 106).

The system architecture 100 enables container/isolation technology at the foglet 122 that enables rapid integration of IT/OT device management software without compromising security. This feature is advantageous as the IT/OT device types are large across varied vendors, each type requiring different software components across different operating systems.

The system architecture 100 also provides for robust application isolation security. In some embodiments, the fognode 124 and its foglet 122 implement mechanisms for isolating applications from each other for variety of reason like OT network security, application protection, multi-tenancy, and data protection—just to name a few. Strict isolation of OT applications and services, such as applications executed within the OT virtual machines 110A-B, is also advantageous to prevent inadvertent interference, Denial of Service (DOS), and malicious DOS from a compromised application.

The system architecture 100 supports security technology methods and algorithms that enable co-location of the IT/OT devices and other infrastructure components on the fognode 124 that enable operation of the IT and OT software components without interfering with other software components. It also enables a secure middleware infrastructure and communication bus for secure data exchange, as well as prevents inadvertent interference and Denial of Service (DOS) effects on the system components due to failures and defects in one set of software components that are co-located. In some embodiments the system architecture 100 prevents malicious Denial of Service (DOS) effects in the system architecture 100 components if vulnerabilities are present in a set of software components that are co-located with one another.

The system architecture 100 enables different monitoring and auditing components that support various logging and alarm collection and forwarding to cloud controller (NSM 128). The system architecture 100 provides a rich set of policies for specifying and filtering logging data, policies for filters, policy for log data source, and so forth.

The system architecture 100 also implements mechanisms for secure application hosting. Rich application deployment at the edge of a network/domain is an important premise in fog computing. Application hosting is primarily implemented for performing real time computation on critical data at locations closer to its source, protect the data from theft and associated loss of intellectual property, reduce the data movement to cloud, and provide for rapid deployment of richer applications from the cloud and in edge analytics applications that refine analytics models in the cloud and on the foglet 122. Application hosting performed from the cloud 106 supports various security constructs. In one embodiment, secure onboarding of an application into an application store functions to verify authenticity of the application and its owner. Only these application store applications are allowed in some embodiments.

Additional security is provided through the use of application certificates and checksum verification in some embodiments, as well as deployment of applications securely on the foglet 122.

Security enhanced Linux (SELINUX) based policies are enabled to prevent malware from running on the foglet 122.

In some embodiments, the foglet 122 enables a powerful role based access control (RBACs) at the instance level of both real and virtual entities (such as any virtual machines) present in the system architecture 100 that can be centrally administered.

According to some embodiments the system architecture 100 implements a check valve message bus for secure message-based communication. Secure messaging for the IT/OT device processing components (e.g., virtual machines) implement one-way data publishing message service to the cloud 106. The message service must be one-way to ensure that the applications/services in the cloud 106 cannot compromise the data bus 109 and gain access to the fognode 124 and subsequently gain access the IT/OT domains 102/104.

A check valve mechanism is implemented over the advanced message queuing protocol (AMQP) pub-sub bus that prevents any external application from compromising the pub-sub data bus and gain access to the internals of the fognode 124. This mechanism is provided by the data bus 109 and instantiated within the forwarder 108. The secure messaging data bus 109 enables only message-based communication from the application VMs 110A-B and 112A-B to the cloud 106.

The secure messaging data bus 109 implements an AMQP protocol based messaging bus and a default implementation is a rabbit message queue based bus.

A check valve function, such as check valve function 138 (illustrated as a VNF or virtual network function) is implemented as a combination of firewalls and an OVS bridge. Each of the virtual machines can implement a check valve function, noted as VNF. In one embodiment the host OS/Hypervisor layer 116 can also implement a check valve function, again noted as VNF.

The VNF provided in the virtual machines can also implement any of single root input/output virtualization (SRIOV), network interface card (NIC) pass through, VLANs and generic routing encapsulation (GRE) tunnels, networking policies like ACL, security groups, firewall rules, and other policies, and any combinations thereof.

A firewall function shuts all the TCP/UDP ports except a messaging port on the cloud interface in a forwarder VM 142 that incorporates the forwarder 108, thereby ensuring only rabbit MQ messages can be transmitted out of the forwarder VM 142 to the cloud 106. In some embodiments, this functionality or process is facilitated through connection to the Internet 111, which is coupled with the administrative VM 114, which is in turn communicatively coupled to the data bus 109 within the forwarder 108. It will be understood that the IT switch can be communicatively coupled to the Internet 111 as illustrated by the dotted communication line.

An OVS bridge (which is comprised of the OT-BR and the IT-BR which are within the OS hypervisor 116) sets up the necessary flows and monitors packet traffic from the cloud 106 to the forwarder VM 142 and prevents any reverse application packets to flow.

Figure 2:
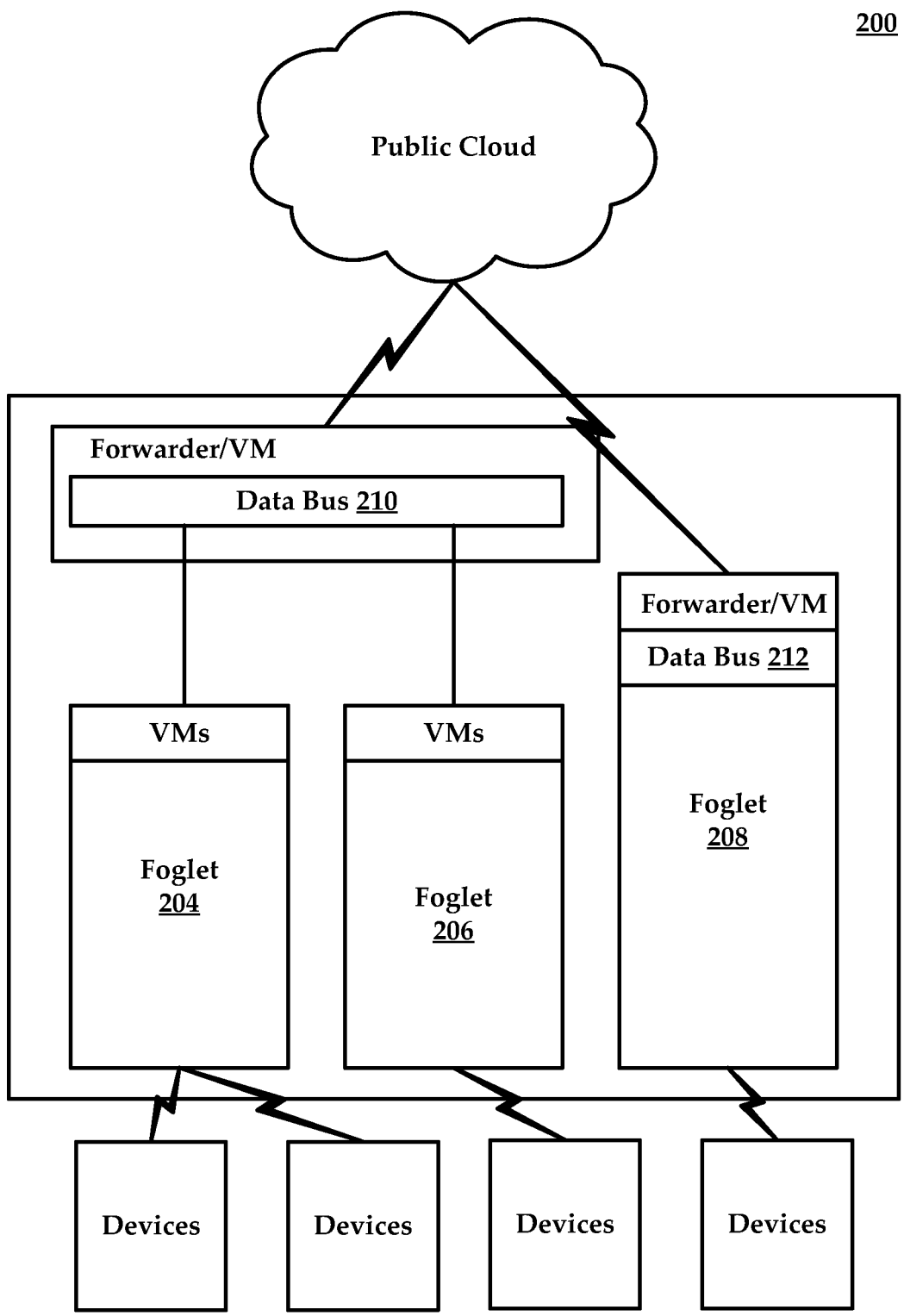
FIG. 2 is a schematic diagram of an example system architecture where multiple foglets in a fognode are serviced by a common data bus and forwarder, whereas other foglets are isolated with their own data bus and forwarder.

The data bus 109 extends across a configured list of foglets and fognodes within the architecture, although as mentioned above, the illustrated embodiment comprises a single fognode 124 and foglet 122. The extended data bus mechanism enables inter-foglet communication and data sharing for load balancing, high availability, and data farming. An example architecture of a plurality of foglets in a single fognode is illustrated in FIG. 2. For example, the architecture 200 illustrates a single fognode 202 that comprises a plurality of foglets 204, 206, and 208. A data bus 210 can extend across foglets 204 and 206. In one embodiment, the data bus 210 can be extended to allow foglet 208 to be included. Foglet 208 can be separate from foglets 204 and 206, including its own data bus 212 for additional security and separation from other foglets on the same fognode, such as foglets 204 and 206.

Referring back to FIG. 1, in some embodiments, data bus 109 messages are TLS encrypted to provide additional security.

The system architecture 100 also provides robust cloud component security through the VNFs such as VNF 140. These security mechanisms minimize exposure of the cloud services, reduce the DOS/DDOS attack surface, prevent data theft and data loss, perform device authentication and authorization, and detect rogue devices and isolate the same—just to name a few. These features are executed through enablement of a network firewall with security group function that permits outbound traffic only to a specific white list of IPV4 and IPV6 addresses. These addresses are destination IP addresses of different cloud controller components deployed as a part of the solution.

In some embodiments, a network access control list (ACL) function allows only a specific list of five tuple filters within a domain of white listed IP addresses. The system architecture 100 utilizes a specific list of X509 certificates that authorizes associated users for remote access of the fognode 124 infrastructure. This functionality is provided by the administrative VM 114.

Other ancillary functions include network log functions that log outbound packets based on enabled filters. A specific list of domains with browser functions that are allowed for cross origin resource sharing (CORS) at the VNF level. This functionality is also provided by the administrative VM 114.

An optional network NAT function for IP address translation is implemented at the VNF level at required connection points. An optional load balancer function for load balancing the ingress traffic for better load distribution at applicable points. In one embodiment, the VNF 138 functions as the load balancer and is present on the egress path going to the Internet to the cloud.

An optional deep packet inspection (DPI) function for analyzing any security threats or for compliance with the management policies can be implemented as well as specific security credentials for encrypting the message sent and received to/from the message queues.

A forwarder 108 present in the forwarder VM 142 represents a set of docker containers that is used for forwarding messages received from the data bus 109 to appropriate cloud layer in a secure manner.

With respect to end user security, the system architecture 100 implements mechanisms that ensure a secure platform infrastructure for end users. The NSM 128 in the cloud 106 provides a powerful role based access control (RBACs). RBACs mechanism enables a configurable set of users/group to access a configurable set of resource instances and perform a configurable set of operations on the selected resource.

The NSM 128 allows only X509 certificate based authentication in some embodiments.

Figure 3:
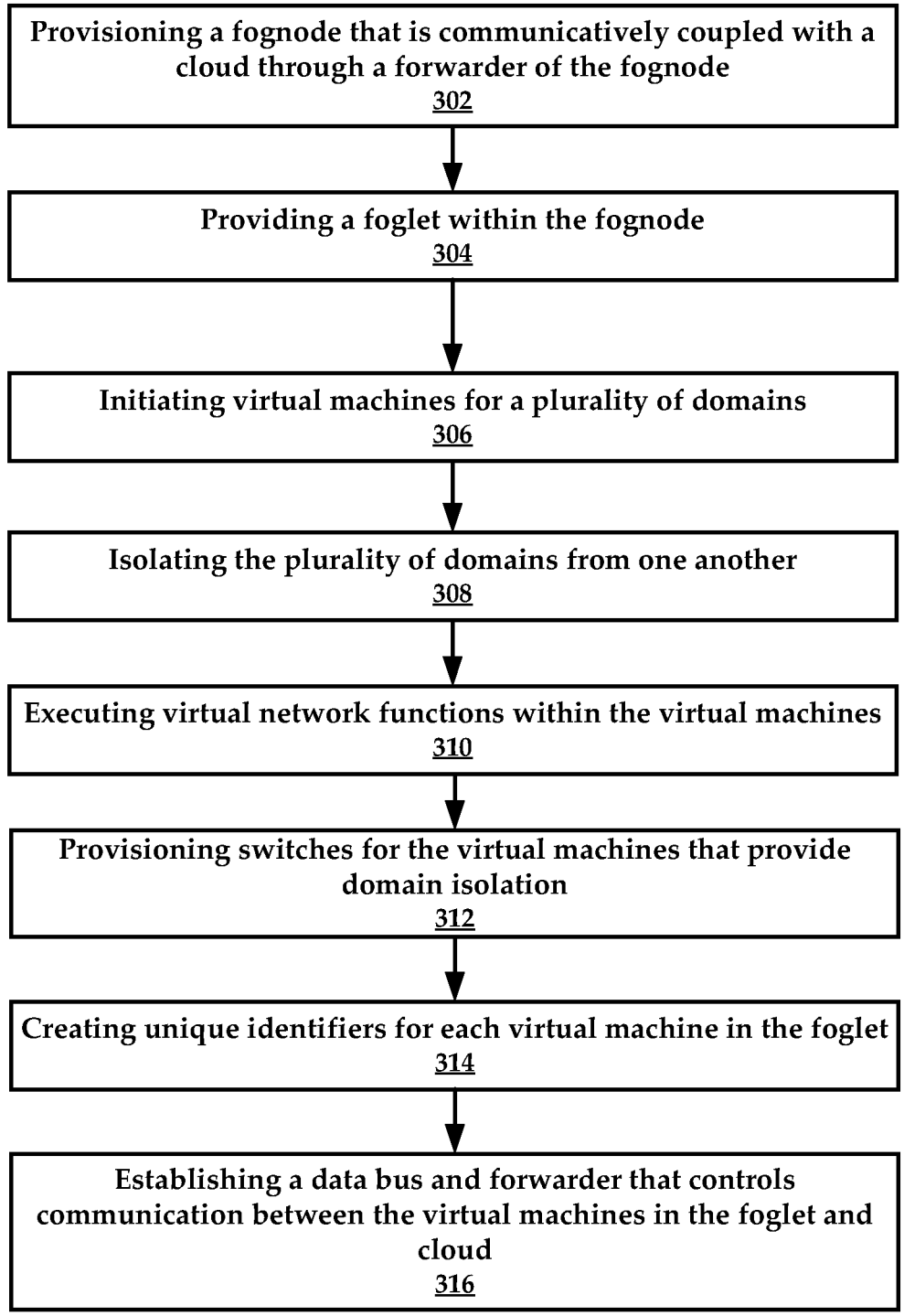
FIG. 3 is a flowchart of an example method for providing a fognode implements enterprise grade security for integrating multiple computing domains with a public cloud.

FIG. 3 is a flow diagram of an example method of the present disclosure. The method includes a step 302 of provisioning a fognode that is communicatively coupled with a cloud through a forwarder of the fognode. The method also comprises a step 304 of providing a foglet within the fognode. Again, the method can include provisioning a plurality of foglets within a single fognode, or provisioning multiple fognodes and/or foglets.

In some embodiments, the method includes a step 306 of initiating virtual machines for a plurality of domains, as well as a step 308 of isolating the plurality of domains from one another by a step 310 of executing virtual network functions within the virtual machines, and a step 312 of provisioning switches for the virtual machines that provide domain isolation.

The virtual machines are assigned compute and storage resources from a host OS and hypervisor layer that assigns compute resources, for example, from a hardware layer.

The switches also control communication between the virtual machines in the foglet and the end point devices (e.g., OT/IT devices). These switches assist in isolating domains from one another by forcing devices to communicate only with assigned virtual machines. This type of communication can occur through or around the host OS/hypervisor.

The method also includes a step 314 of creating unique identifiers for each virtual machine in the foglet. This allows for specific addressing and isolation of each of the virtual machines in the foglet. Each end point device serviced by the foglet such as OT/IT devices are also provisioned with unique identifiers.

In some embodiments the method includes a step 316 of establishing a data bus and forwarder that controls communication between the virtual machines in the foglet and cloud. In various embodiments, the forwarder allows for only unidirectional communication of data from the virtual machines to the cloud. For example, when the cloud comprises a public cloud, the forwarder prevents data from entering the foglet and/or virtual machines from the public cloud.

Figure 4:
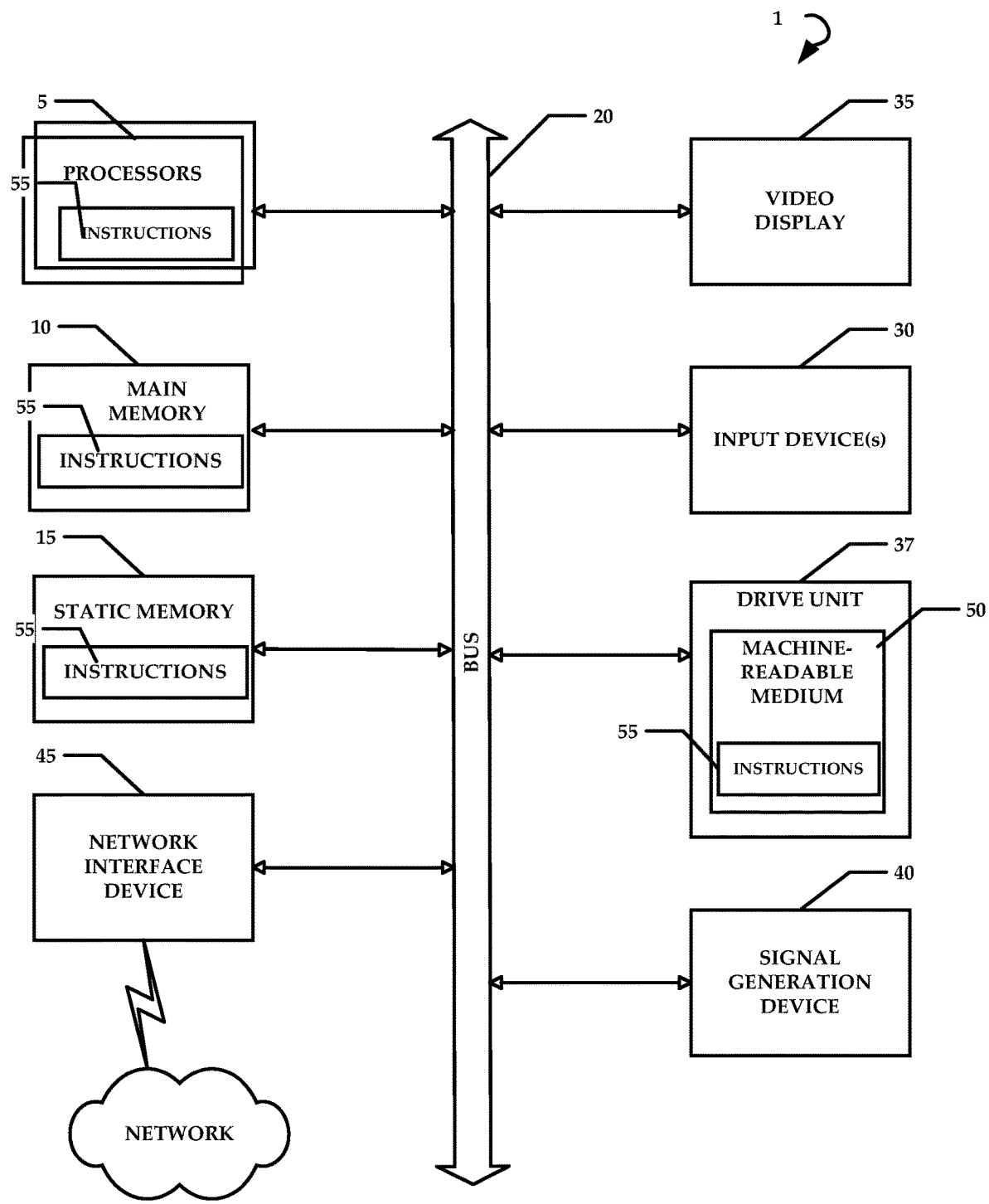
FIG. 4 illustrates an exemplary computing system that may be used to implement embodiments according to the present technology.

FIG. 4 is a diagrammatic representation of an example machine in the form of a computer system 1, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a robotic construction marking device, a base station, a personal computer (PC), a tablet PC, a set-top box (STB), a personal digital assistant (PDA), a cellular telephone, a portable music player (e.g., a portable hard drive audio device such as an Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1 includes a processor or multiple processors 5 (e.g., a central processing unit (CPU), a graphics processing unit (GPU), or both), and a main memory 10 and static memory 15, which communicate with each other via a bus 20. The computer system 1 may further include a video display 35 (e.g., a liquid crystal display (LCD)). The computer system 1 may also include an alphanumeric input device(s) 30 (e.g., a keyboard), a cursor control device (e.g., a mouse), a voice recognition or biometric verification unit (not shown), a drive unit 37 (also referred to as disk drive unit), a signal generation device 40 (e.g., a speaker), and a network interface device 45. The computer system 1 may further include a data encryption module (not shown) to encrypt data.

The drive unit 37 includes a computer or machine-readable medium 50 on which is stored one or more sets of instructions and data structures (e.g., instructions 55) embodying or utilizing any one or more of the methodologies or functions described herein. The instructions 55 may also reside, completely or at least partially, within the main memory 10 and/or within the processors 5 during execution thereof by the computer system 1. The main memory 10 and the processors 5 may also constitute machine-readable media.

The instructions 55 may further be transmitted or received over a network via the network interface device 45 utilizing any one of a number of well-known transfer protocols (e.g., Hyper Text Transfer Protocol (HTTP)). While the machine-readable medium 50 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example embodiments described herein may be implemented in an operating environment comprising software installed on a computer, in hardware, or in a combination of software and hardware.

Not all components of the computer system 1 are required and thus portions of the computer system 1 can be removed if not needed, such as Input/Output (I/O) devices (e.g., input device(s) 30). One skilled in the art will recognize that the Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized in order to implement any of the embodiments of the disclosure as described herein.

As used herein, the term "module" may also refer to any of an application-specific integrated circuit ("ASIC"), an electronic circuit, a processor (shared, dedicated, or group) that executes one or more software or firmware programs, a combinational logic circuit, and/or other suitable components that provide the described functionality.

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the present technology in the form disclosed. Many modifications and variations will be apparent to those of ordinary skill in the art without departing from the scope and spirit of the present technology. Exemplary embodiments were chosen and described in order to best explain the principles of the present technology and its practical application, and to enable others of ordinary skill in the art to understand the present technology for various embodiments with various modifications as are suited to the particular use contemplated.

Aspects of the present technology are described above with reference to flowchart illustrations and/or block diagrams of methods, apparatus (systems) and computer program products according to embodiments of the present technology. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present technology. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the following description, for purposes of explanation and not limitation, specific details are set forth, such as particular embodiments, procedures, techniques, etc. in order to provide a thorough understanding of the present invention. However, it will be apparent to one skilled in the art that the present invention may be practiced in other embodiments that depart from these specific details.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its non-italicized version (e.g., "N+1"). Such occasional interchangeable uses shall not be considered inconsistent with each other.

Also, some embodiments may be described in terms of "means for" performing a task or set of tasks. It will be understood that a "means for" may be expressed herein in terms of a structure, such as a processor, a memory, an I/O device such as a camera, or combinations thereof. Alternatively, the "means for" may include an algorithm that is descriptive of a function or method step, while in yet other embodiments the "means for" is expressed in terms of a mathematical formula, prose, or as a flow chart or signal diagram.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

If any disclosures are incorporated herein by reference and such incorporated disclosures conflict in part and/or in whole with the present disclosure, then to the extent of conflict, and/or broader disclosure, and/or broader definition of terms, the present disclosure controls. If such incorporated disclosures conflict in part and/or in whole with one another, then to the extent of conflict, the later-dated disclosure controls.

The terminology used herein can imply direct or indirect, full or partial, temporary or permanent, immediate or delayed, synchronous or asynchronous, action or inaction. For example, when an element is referred to as being "on," "connected" or "coupled" to another element, then the element can be directly on, connected or coupled to the other element and/or intervening elements may be present, including indirect and/or direct variants. In contrast, when an element is referred to as being "directly connected" or "directly coupled" to another element, there are no intervening elements present. The description herein is illustrative and not restrictive. Many variations of the technology will become apparent to those of skill in the art upon review of this disclosure.

While various embodiments have been described above, it should be understood that they have been presented by way of example only, and not limitation. The descriptions are not intended to limit the scope of the invention to the particular forms set forth herein. To the contrary, the present descriptions are intended to cover such alternatives, modifications, and equivalents as may be included within the spirit and scope of the invention as defined by the appended claims and otherwise appreciated by one of ordinary skill in the art. Thus, the breadth and scope of a preferred embodiment should not be limited by any of the above-described exemplary embodiments.

What is claimed is:

1. A system, comprising:
a fognode comprising at least one foglet executing with the fognode, the foglet comprising:
 a data bus that provides domain-to-domain messaging between:
  a first domain comprising:
   operational technology (OT) virtual machines providing applications and services to operational technology infrastructure devices; and
   one or more operational technology switches;
  a second domain comprising:
   informational technology (IT) virtual machines providing applications and services to informational technology infrastructure devices; and
   one or more informational technology switches; and
 a host that manages one or more communication paths between operational technology switch, the operational technology virtual machines, and the operational technology infrastructure devices, and the informational technology switches, the informational technology, and the informational technology infrastructure devices; and wherein the operational technology switch utilizes I/O virtualization to isolate at least a portion of the operational technology infrastructure devices from the operational technology switch while being exposed to the host.

2. The system according to claim 1, wherein the operational technology domain virtual machines and the informational technology domain virtual machines are strictly isolated through network interface resource management.

3. The system according to claim 2, wherein the operational technology switch and the informational technology switch each build firewalls using virtual switch flow controls, wherein the virtual switch flow controls prevents traffic flows destined for a virtual machine in the first domain to any other virtual machines in the second domain.

4. The system according to claim 1, further comprising a virtual network function module that allows only outbound messaging traffic to a specified list of Internet Protocol Version 4 (IPV4) and Internet Protocol Version 6 (IPV6) addresses of a forwarder domain or a cloud.

5. The system according to claim 1, wherein the operational technology virtual machines and the informational technology virtual machines are configured for unilateral communication to a cloud through a forwarder.

6. The system according to claim 1, wherein the operational technology infrastructure devices and the informational technology infrastructure devices are addressed directly through switch ports of the operational technology switches and the informational technology switches, respectively, further wherein the operational technology infrastructure devices and the informational technology infrastructure devices are maintained in strict isolation from one another.

7. The system according to claim 1, wherein the operational technology switches enable message only communication to and from the operational technology infrastructure devices to the data bus.

8. The system according to claim 1, wherein at least a portion of the operational technology infrastructure devices are port pinned by the operational technology switch to one or more of the operational technology virtual machines so as to bypass the host.

9. The system according to claim 1, wherein a portion of the operational technology infrastructure devices and a portion of the informational technology infrastructure devices are accessible and managed by a substantially real-time function enabled virtual machine to create a virtual local area network.

10. The system according to claim 1, further wherein the system is configured to compute a unique fingerprint for each of the operational technology devices and the informational technology devices, wherein the unique fingerprint is based on operational and device static characteristics.

11. The system according to claim 1, further comprising an administration virtual machine that prevents communication originating from the cloud towards the fognode.

12. The system according to claim 11, further comprising a forwarder domain virtual machine that forwards messages from the operational technology virtual machines to the cloud.

13. The system according to claim 1, further comprising:
a forwarder domain comprising virtual machines and a virtual switch infrastructure that is a gateway to all network traffic destined to the cloud; and
an administrative domain comprising at least one a virtual machine.

* * * * *